United States Patent
Tamaki et al.

(10) Patent No.: US 8,371,724 B2
(45) Date of Patent: Feb. 12, 2013

(54) LIGHT EMITTING DEVICE

(75) Inventors: Yuji Tamaki, Tokyo (JP); Tatsuya Hioki, Tokyo (JP); Eiichi Sugimoto, Tokyo (JP); Tatsuya Goto, Tokyo (JP); Nobuhiro Kobayashi, Tokyo (JP)

(73) Assignees: Stanley Electric Co., Ltd., Tokyo (JP); Asahi Kasei Chemicals Corporation, Tokyo (JP)

( * ) Notice: Subject to any disclaimer, the term of this patent is extended or adjusted under 35 U.S.C. 154(b) by 791 days.

(21) Appl. No.: 12/392,875

(22) Filed: Feb. 25, 2009

(65) Prior Publication Data
US 2009/0219721 A1    Sep. 3, 2009

(30) Foreign Application Priority Data
Feb. 28, 2008    (JP) .................. 2008-048260

(51) Int. Cl.
*F21V 3/00*    (2006.01)
(52) U.S. Cl. .......... 362/311.03; 362/296.04; 362/311.01
(58) Field of Classification Search ............. 362/296.04, 362/311.01, 311.03, 311.14, 311.15, 328, 362/335, 340
See application file for complete search history.

(56) References Cited

U.S. PATENT DOCUMENTS

| | | |
|---|---|---|
| 5,160,192 A | 11/1992 | Sugawara |
| 5,449,709 A * | 9/1995 | Imae et al. ................ 524/154 |
| 2005/0117318 A1* | 6/2005 | Tenmyo ..................... 362/328 |
| 2007/0121343 A1* | 5/2007 | Brown ..................... 362/296.04 |
| 2008/0174874 A1* | 7/2008 | Kanaya .................... 359/599 |

FOREIGN PATENT DOCUMENTS

| | | |
|---|---|---|
| JP | H02-62425 U | 5/1990 |
| JP | 2001-166114 A | 6/2001 |

OTHER PUBLICATIONS

Chinese Office Action received in related Chinese Patent Application No. 200910118086.7 dated Aug. 24, 2011.

* cited by examiner

*Primary Examiner* — Y My Quach Lee
(74) *Attorney, Agent, or Firm* — Kenealy Vaidya LLP

(57) ABSTRACT

The present invention is directed to a small-sized stroboscopic light emitting device that controls disorder in light distribution (orientation) characteristic caused by a shape of the reflector, and achieves a homogeneous light quantity distribution. The stroboscopic light emitting device includes an illuminator 1, a reflector 2 for reflecting light from the reflector, and a lens 3 for allowing the light reflected by the reflector 2 to pass through and illuminate outwardly, and the lens 3 contains a filler 4 in the base material. A refractive index and a mean particle size of the filler are between or equal to 1.3 to 2.8 and between or equal to 0.1 μm to 20 μm, respectively, and the filler is contained in the base material at the rate between or equal to 0.1 parts by weight to 3.0 parts by weight, per 100 parts by weight of the base material. Since the filler diffuses the passing light adequately, even though the reflector is provided with a bend, local disorder in light distribution (orientation) characteristic caused by the bend can be suppressed.

3 Claims, 4 Drawing Sheets

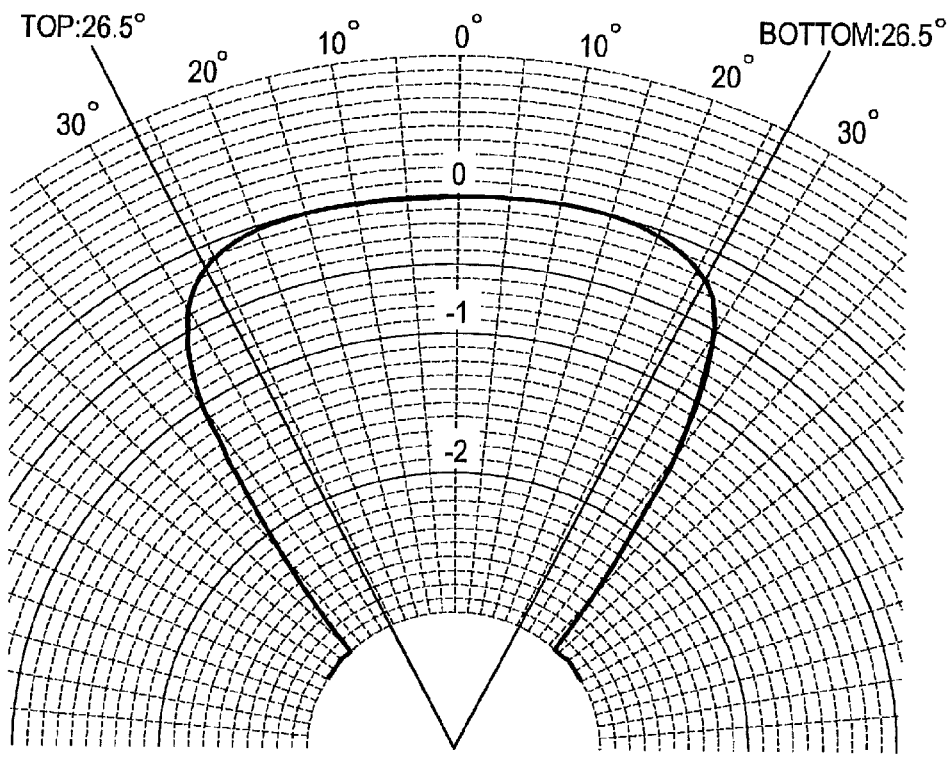
FIG. 4A    PRESENT EMBODIMENT
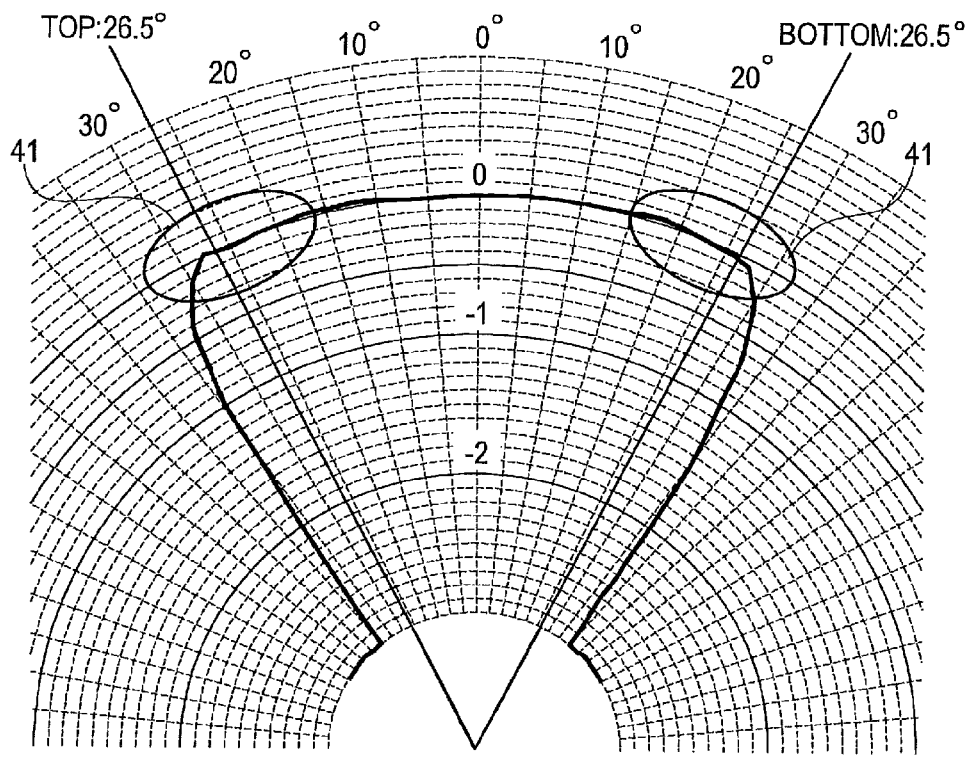
FIG. 4B    NO FILLER ADDED

PRESENT EMBODIMENT

NO FILLER ADDED

LIGHT EMITTING DEVICE

FIELD OF THE INVENTION

This application claims priority under 35 U.S.C. §119 to Japanese Patent Application No. 2008-048260, filed Feb. 28, 2008, the entirety of which is incorporated by reference herein.

The present invention relates to a stroboscopic light emitting device, and more particularly, it relates to a stroboscopic light emitting device with a light emitting part that is small in aperture diameter.

DESCRIPTION OF THE RELATED ART

The stroboscopic light emitting device has a configuration in which light from an illuminator such as a xenon (Xe) tube, is reflected forward by a reflector, as described in the Japanese Utility Model (Registration) Application Laid-Open Publication No. 2-62425, for instance. The reflector is formed in such a manner as covering the illuminator from the rear side, and from the four side surfaces of left, right, top and bottom. A lens is disposed at an opening forward of the reflector. The lens refracts light beams into the optical direction, the light beams outgoing in such a manner as expanding outwardly from both sides of the aperture. Accordingly, it is possible to increase a light quantity which is illuminated on a photographic subject, and therefore, the amount of supply current for the illuminator such as the Xe tube can be reduced. A lens cut, and a shape of curve or a structure of the reflector are designed appropriately to achieve a predetermined light quantity and distribution (orientation) characteristic.

When the reflector is made of a light reflective material such as aluminum, a plate-like light reflective member is subjected to a sheet metal processing, by using a sheet metal die, in general, so as to form a curved surface of the reflector with a predetermined design value. However, when the curved surface is formed by using the sheet metal die, a large number of planar surfaces are combined to generate the curved surface, and therefore, the reflector has a shape being bent at each joint between the planar surfaces. In particular, in the case of a stroboscopic light emitting device built in a camera, being small in aperture diameter such as equal to or less than 1 cm, for instance, it is difficult to treat the curved surface of the reflector. In this case here, the curved surface is approximated by a small number of surfaces, and therefore, the reflector is prone to have a shape being bent on a large scale at each joint between the surfaces. Consequently, at each joint between the surfaces, the direction of the reflected light beams emitted from the illuminator varies in a discontinuous manner, and this may cause disorder in light distribution (orientation) characteristic at the joint part. If photographing is carried out using a strobe with such disordered light distribution (orientation) characteristic, a distribution of light quantity illuminated on the photographic subject is impaired, thereby damaging an image quality.

In accordance with an aspect of the present invention a small-sized stroboscopic light emitting device can be configured to suppress a disorder in light distribution (orientation) characteristic, which may be caused by a shape of the reflector, and to achieve a homogeneous distribution of light quantity.

SUMMARY OF THE INVENTION

In accordance with an aspect of the present invention a strobe apparatus can include an illuminator, a reflector for reflecting light from the illuminator, and a lens for allowing passage of the light reflected by the reflector to illuminate outwardly, wherein the lens contains a base material and a filler in the base material. This filler can have a refractive index between or equal to 1.3 to 2.8, and a mean particle size between or equal to 0.1 μm to 20 μm. The filler can be contained in the base material at the rate between or equal to 0.1 parts by weight to 3.0 parts by weight, per 100 parts by weight of the base material. Since the lens contains the filler as described above, the filler causes a scattering of passing light appropriately. Therefore, even though the reflector includes bends, it is possible to suppress local disorder in a light distribution (orientation) characteristic, which is caused by such bends.

By way of example, a shape formed by bending a planar member can be used as the reflector. Even in the case where the reflector employing such bent shape is used, disorder in light distribution (orientation) characteristic can be suppressed by the action of the filler. Accordingly, a small-sized stroboscopic light emitting device can be produced easily.

BRIEF DESCRIPTION OF THE DRAWINGS

FIG. 4A is a graph illustrating the orientation characteristic of the small-sized stroboscopic light emitting device according to the present embodiment, and FIG. 4B is a graph illustrating the orientation characteristic of the small-sized stroboscopic light emitting device according to the comparative example.

DESCRIPTION OF THE PREFERRED EMBODIMENT

A small-sized stroboscopic light emitting device according to one embodiment of the present invention will be explained, with reference to the accompanying drawings.

In the present invention, in order to solve the problem that disorder in light distribution (orientation) characteristic occurs in a small-sized stroboscopic light emitting device, a filler is added to a lens disposed at a position forward of the reflector, allowing the light reflected from the reflector to diffuse. Accordingly, the small-sized stroboscopic light emitting device that achieves less disorder in light distribution (orientation) characteristic is implemented, which enhances a quality of an image taken by using this stroboscopic light emitting device.

The stroboscopic light emitting device according to the present embodiment is small in size, having a small aperture of a light emitting part directed to a photographic subject, just like a flash built in a camera, for instance, and the smallest part (minor axis) of the aperture is not larger than 1 cm.

Figure 1:
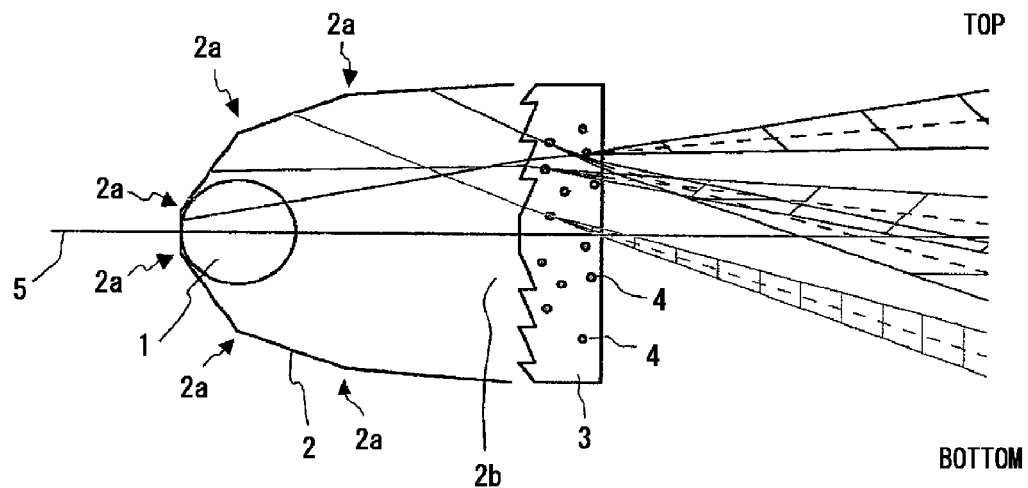
FIG. 1 illustrates a structure of the small-sized stroboscopic light emitting device according to the present embodiment.

As shown in FIG. 1, the stroboscopic light emitting device is provided with an illuminator 1, a reflector 2, and a lens 3. By way of example, a Xe tube, an LED, an electric bulb or the like may be used as the illuminator 1. The reflector 2 has a shape to cover the rear and the four side surfaces of the illuminator 1, and on the front side, an aperture 2b is provided for outputting light beams toward the photographic subject. The lens 3 is arranged in such a manner as covering the aperture 2b of the reflector 2. Though not illustrated in FIG. 1, there is a case on the outer side of the reflector 2, in order to support the reflector 2, and the lens 3 is supported by the opening of the case.

The reflector 2 reflects the light outgoing from the illuminator 1 in the direction of the aperture 2b. The reflector 2 is produced by subjecting a plate-like reflective member such as aluminum, to a sheet metal processing by using a sheet metal die. The reflecting surface of the reflector 2 has a shape generated by combining multiple planar surfaces, and a joint between the planar surfaces generates a bend 2a, indicating that the reflector 2 is bent at that part.

The lens 3 is provided for refracting the light into the direction of an optical axis 5, the light outgoing directly from the illuminator 1 or reflected by the reflector 2 to be incident upon the lens 3. In the example here, a Fresnel lens is employed as the lens 3.

A shape of the reflective surface of the reflector 2, and a refractive index and shape of the lens 3 are designed in such a manner that the light expanding outwardly is focused in the direction of the optical axis 5, so as to achieve a predetermined light distribution (orientation) characteristic and a predetermined light quantity which are necessary for the stroboscopic light emitting device.

As shown in FIG. 1, light-diffusing fine particles (filler) 4 are added to a transparent resin being a base material of the lens 3. Addition of the filler 4 diffuses the light that passes through the lens 3. A refractive index, a particle size, and an additive amount of the filler 4 are set to be appropriate values. Accordingly, a degree of light orientation by the filler 4 is controlled, and local disorder in light distribution (orientation) characteristic is reduced, while maintaining the predetermined light quantity and the predetermined orientation angle of the stroboscopic light emitting device, which are achieved by the shape of the reflective surface of the reflector 2, the refractive index of the base material and the shape of the lens 3.

Hereinafter, the base material of the lens 3 and the filler 4 will be explained.

In the present embodiment, a transparent resin is employed as the base material of the lens 3. In particular, a thermoplastic resin is used for enabling an injection molding.

Following resins may be available as the thermoplastic resin: methacrylic resin; polycarbonate resin; polystyrene resin; high impact polystyrene; AS resin which is a copolymer of acrylonitrile and styrene; ABS resin which is a terpolymer of three components, acrylonitrile, butadiene, and styrene; MS resin which is a copolymer of methyl methacrylate and styrene; MBS resin which is a terpolymer of three components, methyl methacrylate, butadiene, and styrene; polyethylene, polyethylene terephthalate; alicyclic acrylic resin; alicyclic polyolefin resin; olefin-maleimide alternating copolymer; cyclohexadiene type polymer; or the like. From a viewpoint of light resistance, the methacrylic resin or the MS resin is taken as a preferable resin. As for the methacrylic resin, a resin having methyl methacrylate as a main component is more preferable.

If the methacrylic resin is used, preferably, it is a polymer or a copolymer of 70 to 100 weight % of methyl methacrylate, and 30 to 0 weight % of monomer to be copolymerized therewith. In particular, it is preferable that the weight average molecular weight of the methacrylic resin is from 70,000 to 220,000, and the range from 80,000 to 200,000 is more preferable.

As the monomer copolymerizable with methyl methacrylate, following components are taken as examples: methacrylic acid ester, such as butyl methacrylate, ethyl methacrylate, propyl methacrylate, cyclohexyl methacrylate, phenyl methacrylate, and methacrylic acid 2-ethylhexyl; acrylic acid ester, such as methyl acrylate, ethyl acrylate, butyl acrylate, cyclohexyl acrylate, phenyl acrylate, and acrylic acid 2-ethylhexyl; and aromatic vinyl compound such as methacrylic acid, acrylic acid, styrene, maleic anhydride, 2-hydroxy acrylate, α-methylstyrene; or the like. In particular, it is further possible to employ a methacrylic resin composition, whose heat resistance is enhanced by using methacrylic acid or maleic anhydride as a comonomer. Such monomers as described above, which are copolymerizable with methyl methacrylate, may be used by taking one kind or combining at least two kinds thereof. It is further possible to use a methacrylic resin composition to which acrylic rubber of multi-layer structure is added for impact resistance. Moreover, a bimodal methacrylic resin with an improved flow characteristic is also available.

A method for producing such methacrylic resin as described above is not particularly limited, and any publicly known methods can be employed, such as suspension polymerization, emulsion polymerization, bulk polymerization, and solution polymerization.

In the present embodiment, "MS resin" indicates a resin having a copolymer of methyl methacrylate and styrene as a main component, but it may include a multi-component copolymer, which is obtained by adding at least any one of the examples of copolymerizable monomers described above for producing the methacrylic resin. If the ratio of methyl methacrylate is over 70 parts by weight, per 100 parts by weight of the entire MS resin, this MS resin is preferable because it has a good light resistance.

As the light-diffusing fine particle (filler) 4, it is possible to use an inorganic fine particle, such as alumina, titanium oxide, calcium carbonate, barium sulphate, silicon dioxide, and glass beads; an organic fine particle such as crosslinked styrene bead, crosslinked MS bead, and crosslinked siloxane type bead, or the like. It is further possible to use a crosslinked hollow particle composed of a resin material having high transparency, such as a methacrylic type resin, polycarbonate type resin, MS resin, cyclic olefin resin; and a hollow fine particle composed of glass, or the like.

In particular, a crosslinked organic particle is desirable for the filler 4. By the use of the crosslinked organic particle as the filler, it is possible to design a superior molding material, having less unevenness in dispersing of light diffusing agent, high optical transparency, and high light diffuseness within the methacrylic resin that constitutes a matrix (base material). A particularly desirable crosslinked organic particle is an acrylic type resin particle, styrene type resin particle, and crosslinked silicone type particle. A crosslinked copolymer particle of a monofunctional vinyl monomer, such as methyl methacrylate, and a polyfunctional vinyl monomer may be taken as an example of the acrylic type resin particle. A crosslinked copolymer particle of a styrene monomer and a polyfunctional vinyl monomer may be taken as an example of the styrene type resin particle, for instance.

It is to be noted that for the filler 4, any type of the fine particles described above may be used in isolation, or multiple types thereof may be used in combination, and there is no restriction for the usage.

The filler 4 to be used here has the range of refractive index between or equal to 1.3 to 2.8. In particular, the range between or equal to 1.3 to 2.0 is preferable, and the range between or equal to 1.3 to 1.7 is more preferable. This range above is preferable because if the refractive index is lower than 1.3, scattering becomes too weak to contribute to "image quality enhancement". On the other hand, if the refractive index exceeds 1.7, the scattering becomes too strong, and a part of the light goes outside of a required angle of field. This may easily cause a reduction of light quantity and lowering of light distribution angle, resulting in an unfavorable condition.

It is to be noted here that the refractive index referred to here is a value obtained by the measurement carried out by using D line (589 nm) at the temperature of 20° C. There is an example of method for measuring the refractive index of the filler (fine particle) 4 as the following; fine particles are immersed in the liquid whose refractive index is allowed to vary gradually, and interfaces between the fine particles and the liquid are observed while varying the refractive index of the liquid. Then, the refractive index of the liquid is measured when the interfaces between the fine particles and the liquid become unclear, and this is assumed as the refractive index of the fine particle. Abbe refractometer or the like may be employed for measuring the refractive index of the liquid.

The filler 4 to be used here has a mean particle size between or equal to 0.1 µm to 20 µm. In particular, the range between or equal to 0.3 µm to 15 µm is preferable, and the range between or equal to 0.5 to 10 µm is more preferable. Further preferably, the range should be between or equal to 1.0 µm to 7.0 µm. The range above is preferable because if the mean particle size is equal to or lower than 20 µm, it is possible to allow the outgoing light to diffuse, achieving a target diffusion property necessary for the stroboscopic light emitting device. If the mean particle size is equal to or higher than 0.1 µm, light loss toward the rear side (the illuminator 1 side) due to the reflection, or the like, can be suppressed, thereby allowing the incident light to diffuse efficiently toward a luminous surface side (photographic subject side). Therefore, it becomes possible to obtain a target light quantity necessary for the stroboscopic light emitting device.

The additive amount (blending quantity) of the filler 4 to the base material (transparent thermoplastic resin) is set to between or equal to 0.1 parts by weight to 3.0 parts by weight, per 100 parts by weight of the base material (transparent thermoplastic resin). In particular, the range between or equal to 0.3 parts by weight to 2.0 parts by weight is preferable, and the range between or equal to 0.5 parts by weight to 1.5 parts by weight is more preferable. Further preferably, the range should be between or equal to 0.5 parts by weight to 1.0 parts by weight. The range above is preferable because if the additive amount is equal to or smaller than 3.0 parts by weight, it is possible to obtain a predetermined light quantity and distribution (orientation) necessary for the stroboscopic light emitting device. If the additive amount is set to be equal to or larger than 0.1 parts by weight, achieving the development of the light diffusion effect of the filler (light diffusing fine particles) 4, thereby contributing to the enhancement of the image quality.

Preferably, the transmission factor of the lens 3, after the filler 4 is added and the lens 3 is molded, falls in the range between or equal to 80% to 95%. If the transmission factor is lower than 80%, the light diffuseness becomes so strong that the light quantity for the strobe apparatus goes down. If the transmission factor exceeds 95%, there is too much transmission light, causing a deterioration of the light diffusing effect. Variation of the additive amount of the filler 4 may control the transmission factor of the lens. It is to be noted that the transmission factor can be measured by measuring total light transmission, for instance. According to the method defined in JIS K 7105 "Testing methods for optical properties of plastics", a resin sheet is cut out in a sample size of 50×50 mm, and subsequently, a turbidimeter (model No. 1001DP, a product of Nippon Denshoku Industries Co., Ltd.) is used to measure the total light transmission.

Here, a method for producing the lens 3 will be explained. Firstly, the filler (light diffusing fine particle) 4 is homogeneously dispersed in the base material (thermoplastic transparent resin). A publicly known method may be employed as the dispersion method. By way of example, it is preferable that after mixing by a drum blender or a Henschel mixer, the materials are melt and kneaded by a vent-type uniaxial or biaxial extruder at the temperature from 220° C. to 250° C., and then a pellet is obtained. Thereafter, the pellet is molded by an injection molding machine, at the resin temperature from 240° C. to 250° C., and eventually, the lens 3 is obtained.

The lens 3 obtained according to the procedure above is disposed at the opening of the reflector 2 that has been produced separately, by the use of a sheet-metal die. Actual steps of assembling procedure are; firstly, the reflector 2 is placed within a case not illustrated, the illuminator 1 is placed inside the case, and then, the lens 3 is fixed on the opening of the case.

Figure 2:
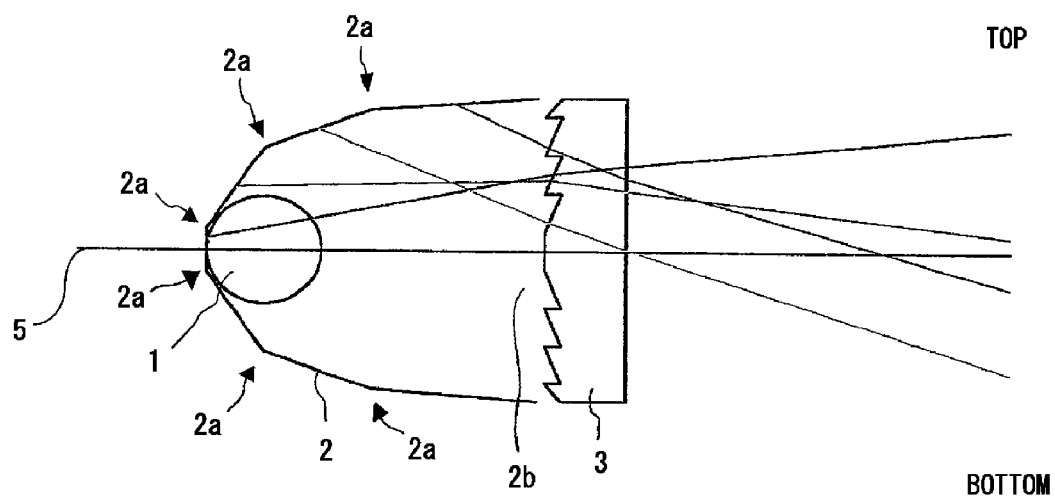
FIG. 2 illustrates a structure of the small-sized stroboscopic light emitting device according to a comparative example.

Next, the operation of each element in the small-sized stroboscopic light emitting device according to the present embodiment, as shown in FIG. 1, will be explained, in contrast with the apparatus shown in FIG. 2, in which the filler is not added. The apparatus shown in FIG. 2 has the same configuration as the small-sized stroboscopic light emitting device shown in FIG. 1, except that the filler 4 is not added to the lens 3.

The light outputting from the illuminator 1 goes to the opening 2b, directly or reflected by the reflector 2, and enters the lens 3. The outgoing light which expands outwardly from the opening is refracted into the optical axis direction by the lens 3. With this operation, the light quantity illuminated on the photographic subject is increased, thereby achieving predetermined light quantity and distribution (orientation) characteristic.

Figure 3:
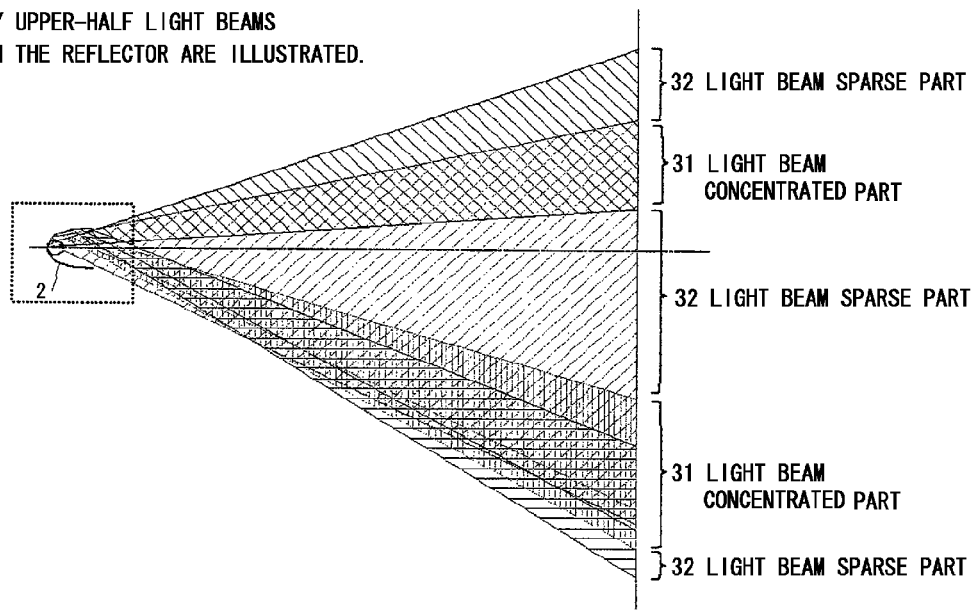
FIG. 3 illustrates sparse or dense pencils of light reflected by the reflector 2 according to the present embodiment.

In this situation, since bends 2a are provided on the reflector 2, a reflecting angle at each bend 2a varies in a discontinuous manner. Therefore, as shown in FIG. 3, in the light entering the lens 3 directly from the illuminator 1 or reflected by the reflector 2, there are developed a light beam concentrated part 31 where the reflected light beams overlap one on another and a light beam sparse part 32 where the reflected light beams do not overlap. Such sparse or dense condition of the incident light beams may be mostly improved when the light beams pass through the lens 3. However, if the lens 3 that does not contain the filler 4 as shown FIG. 2 is used, there are developed some parts 41 as shown in FIG. 4(b), where local disorder occurs in orientation characteristic.

On the other hand, in the present embodiment, the lens 3 contains the filler 4, and the refractive index, the particle size, and the additive amount are appropriately configured as described above. Therefore, the light entering the lens 3 is diffused adequately. Accordingly, as shown in FIG. 4(a), it is possible to suppress the local disorder in orientation characteristic.

Figure 5A:
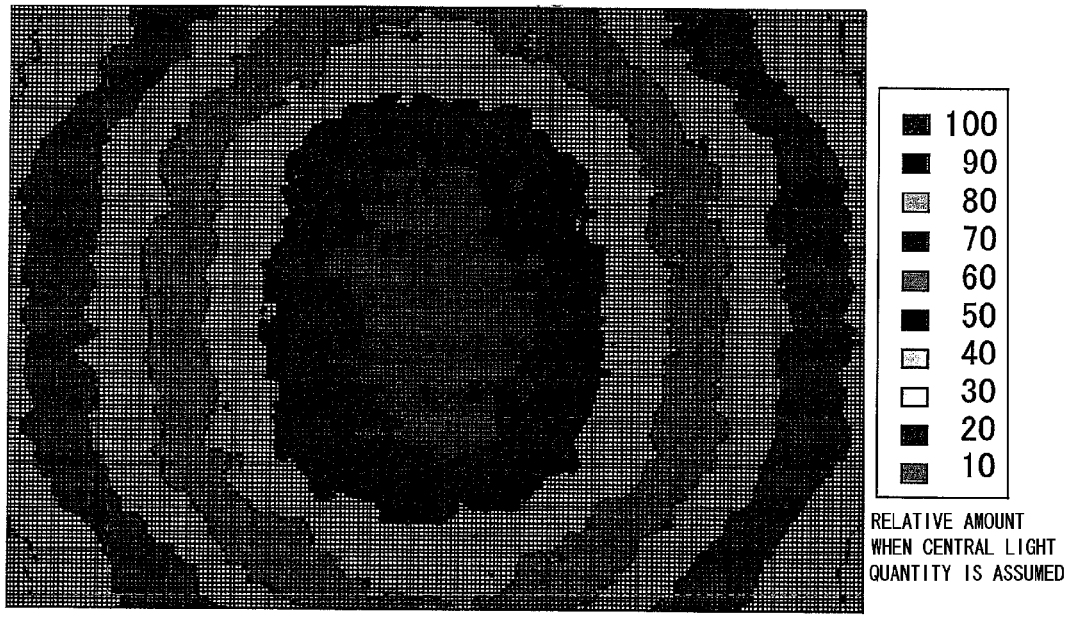
FIG. 5A is a graph illustrating a light quantity distribution on a photographic subject, when light is illuminated on the photographic subject from the small-sized stroboscopic light emitting device according to the present embodiment.
Figure 5B:
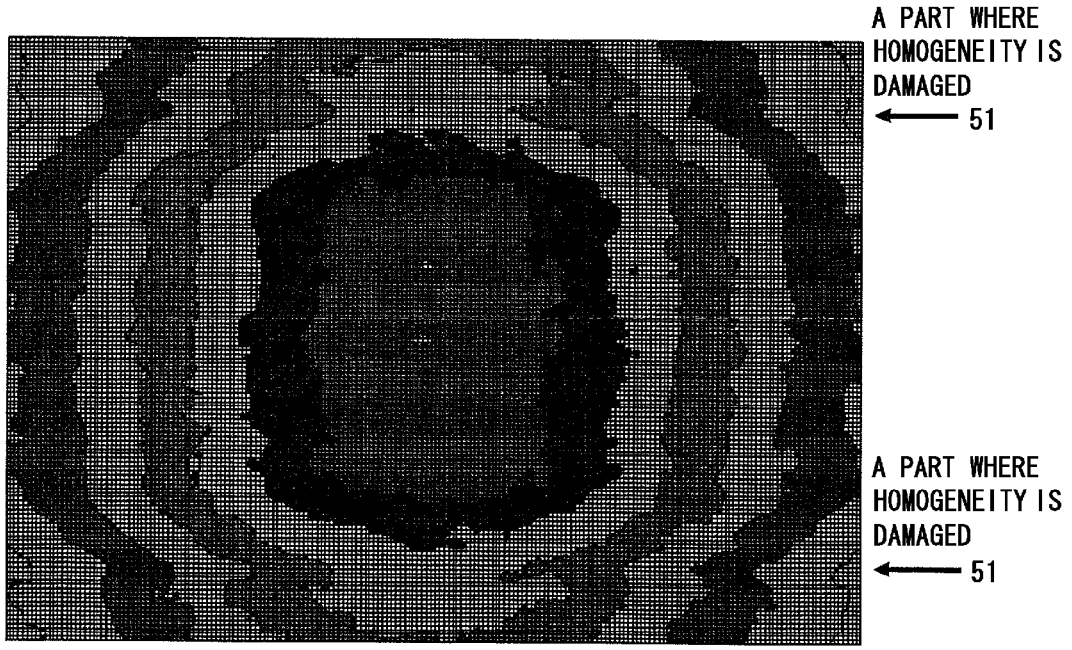
FIG. 5B is a graph illustrating the light quantity distribution on the photographic subject, when light is illuminated on the photographic subject from the small-sized stroboscopic light emitting device according to a comparative example.

FIG. 5(a) and FIG. 5(b) illustrate the light quantity distribution on the photographic subject (planar surface), on which the light is illuminated, respectively when the stroboscopic light emitting device according to the present embodiment is used, and when the stroboscopic light emitting device in which the filler is not added is used. As shown in FIG. 5(b), the light quantity distribution, which is obtained by illuminating from the stroboscopic light emitting device as shown in FIG. 2 without any addition of the filler, includes a region 51 where isophotal contour lines vary in a discontinuous manner, and homogeneity is damaged. On the other hand, the light quantity distribution, which is obtained by illuminating from the stroboscopic light emitting device according to the present embodiment, shows the isophotal contour lines forming almost concentric circles, and it is found that the light distribution varies gradually and continuously.

As thus described, by the use of the stroboscopic light emitting device according to the present invention, in which the filler is added to the lens 3, the disorder in light distribution (orientation) characteristic caused by the bend 2a of the reflector 2 can be improved, relative to the stroboscopic light emitting device to which the filler is not added. Accordingly, the photographic subject is illuminated evenly, and therefore, when an image is taken by a camera, an image quality can be enhanced.

Since the filler 4 can be added, as it is, to the base material resin of the lens 3 conventionally used, properties of the base material are not damaged. Furthermore, molding can be performed in the same manner as a conventional molding method.

The degree of the light diffusion is controlled by using parameters such as a type of filler 4, a particle size and an additive amount thereof, and it is possible to obtain an orientation angle that is peculiar to the strobe, without lowering the light quantity. Since the shape of the reflector 2 can be designed by a conventional design method, there is another effect that the orientation characteristic can be enhanced easily.

The small-sized stroboscopic light emitting device of the present embodiment is applicable generally to any types of camera-use strobe apparatus (including a light used for video recording).

DESCRIPTION OF THE PREFERRED EMBODIMENTS

Hereinafter, preferred embodiments of the present invention will be explained.

Examples 1 to 7

Lens 3 according to each of example 1 to example 7 was produced as the following. In the examples 1 to 7, a methacrylic resin was used as a base material, and crosslinked MS type particles were added as the filler 4, the particle being a product of Sekisui Plastics Co. Ltd., XX51F, and approximately 5 μm in mean particle size. The additive amount of the filler 4 was changed for each of the examples 1 to 7, and it was set to 0.1 parts by weight, 0.3 parts by weight, 0.5 parts by weight, 1.0 parts by weight, 1.5 parts by weight, 2.0 parts by weight, 3.0 parts by weight, for the respective examples, per 100 parts by weight of the base material.

Furthermore, an ultraviolet absorbent (a product of Shipro Kasei Kaisha, Ltd., seesorb 703) was added to the base material, in addition to the filler 4.

A production method will be explained briefly. By using a drum blender, a predetermined amount of filler 4 and 0.51 parts by weight of ultraviolet absorbent (a product of Shipro Kasei Kaisha, Ltd., seesorb 703) were mixed, per 100 parts by weight of the base material, the materials were kneaded using a 30 mm biaxial extruder, at the temperature from 230° C. to 250° C., and then granulation was performed to obtain a composition.

Thereafter, the composition was molded by an injection molding machine at the resin temperature from 240° C. to 250° C., and eventually, the lens 3 was produced.

Comparative Examples 1 and 2

The lens of comparative example 1 and the lens of comparative example 2 were produced, setting the additive amount of the filler 4 to 0.05 parts by weight and 3.5 parts by weight, respectively, and the other conditions were configured to be the same as the examples 1 to 7.

(Evaluation)

The lens being produced according to the procedure above was placed in front of the reflector 2, and quality evaluation was performed according to the following method. An image obtained by photographing measurement (photo shooting) using strobe light emission, was observed by visual inspection, and the image was categorized and judged according to a light quantity distribution and a level of the light quantity and orientation.

GOOD: Almost no disorder is found in the light quantity distribution, and a predetermined light quantity and orientation are satisfied.

VERY GOOD: The least disorder is found among the samples of category "GOOD", and the light quantity and orientation are satisfied excellently.

AVERAGE: Some disorder is found in the light quantity distribution, or the predetermined light quantity and orientation are not satisfied to some extent.

POOR: Significant disorder is found in the light quantity distribution, or the predetermined light quantity and orientation are seriously unsatisfied.

Results of the evaluations regarding the examples 1 to 7 and comparative examples 1 and 2 are shown in Table 1.

TABLE 1

|  | Comparative Example 1 | Example 1 | Example 2 | Example 3 | Example 4 | Example 5 |
|---|---|---|---|---|---|---|
| Qty. of Filler | 0.05 | 0.1 | 0.3 | 0.5 | 1.0 | 1.5 |
| Judgment | POOR | AVERAGE | AVERAGE | GOOD | VERY GOOD | GOOD |

|  | Example 6 | Example 7 | Comparative Example 2 |
|---|---|---|---|
| Qty. of Filler | 2.0 | 3.0 | 3.5 |
| Judgment | GOOD | AVERAGE | POOR |

As obvious from Table 1, it is found that in the examples 1 to 7 where the additive amount of the filler 4 to the base material was set to between or equal to 0.1 parts by weight to 3.0 parts by weight per 100 parts by weight of the base material, the result of the evaluation is "GOOD: Almost no disorder is found in the light quantity distribution, and a predetermined light quantity and orientation are satisfied", or "AVERAGE: Some disorder is found in the light quantity distribution, or the predetermined light quantity and orientation are not satisfied to some extent". On the other hand, in the comparative example 1 where the additive amount was smaller than 0.1 parts by weight, and in the comparative example 2 where the additive amount was larger than 3.0 parts by weight, the result of the evaluation is "POOR: Significant disorder is found in the light quantity distribution, or the predetermined light quantity and orientation are seriously unsatisfied".

In addition, both of the example 1 where the additive amount was 0.1 parts by weight and the example 2 where the additive amount was 0.3 parts by weight indicate "AVERAGE" according to the above evaluation criteria. However, if the two examples are compared, example 2 is superior in the viewpoint that the sample of example 2 showed less disorder in the light quantity distribution and more satisfactory result in the predetermined light quantity and orientation. The evaluation results of both the example 6 where the additive amount was 2.0 parts by weight and the example 5 where the additive amount was 1.5 parts by weight indicated "GOOD", but the sample of the example 5 is superior from the viewpoint above. Furthermore, the evaluation result of the sample of example 4 where the additive amount was 1.0 indicates "VERY GOOD", and it is the best result. According to the results described above, it is found that the range between or equal to 0.3 parts by weight to 2.0 parts by weight is preferable, and more preferably, the range should be between or equal to 0.5 parts by weight to 1.5 parts by weight. It is further found that the range between or equal to 0.5 parts by weight to 1.0 parts by weight is more desirable.

Examples 8 to 11

Lens 3 according to each of example 8 to example 11 was produced as the following. In the examples 8 to 11, a methacrylic resin with refractive index 1.49 was used as the base material, and as the filler 4, fluorine type fine particles with refractive index 1.3, alumina fine particles with refractive index 1.7, barium sulfide fine particles with refractive index 2.0, and titanium oxide fine particles with refractive index 2.8 were added, respectively.

The mean particle size of the filler 4 was set to 5 µm in any of the examples. Moreover, the additive amount of the filler 4 was set to 0.75 parts by weight per 100 parts by weight of the base material, in any of the examples 8 to 11. An ultraviolet absorbent (product of Shipro Kasei Kaisha, Ltd., seesorb 703) was also added to the base material, in addition to the filler 4. The method for producing the lens 3 was the same as the example 1.

Comparative Examples 3 and 4

The lens of comparative example 3 and the lens of comparative example 4 were produced, using as the filler 4, fluorine type fine particles with refractive index 1.29 and alumina fine particles with refractive index 3.2, respectively, and the other conditions were configured to be the same as the examples 8 to 11.

(Evaluations)

Table 2 shows results of the evaluation regarding samples of the examples 8 to 11 and comparative examples 3 and 4, according to the method that is the same as the example 1.

TABLE 2

|  | Comparative Example 3 | Example 8 | Example 9 | Example 10 | Example 11 | Comparative Example 4 |
|---|---|---|---|---|---|---|
| Refractive index | 1.29 | 1.3 | 1.7 | 2.0 | 2.8 | 3.2 |
| Judgment | POOR | VERY GOOD | GOOD | AVERAGE | AVERAGE | POOR |

Evaluation criteria of "GOOD", "AVERAGE", and "POOR" shown in Table 2 is the same as the evaluation criteria shown in Table 1.

As obvious from Table 2, it is found that in the examples 8 to 11 where the refractive index of the filler 4 was set to between or equal to 1.3 to 2.8, the result of the evaluation is "GOOD: Almost no disorder is found in the light quantity distribution, and a predetermined light quantity and orientation are satisfied", or "AVERAGE: Some disorder is found in the light quantity distribution, or the predetermined light quantity and orientation are not satisfied to some extent". On the other hand, in the comparative example 3 where the refractive index was smaller than 1.3, and in the comparative example 4 where the refractive index was larger than 2.8, the result of the evaluation is "POOR: Significant disorder is found in the light quantity distribution, or the predetermined light quantity and orientation are seriously unsatisfied".

The evaluation results of the samples in both the example 10 where the refractive index was 2.0, and in the example 11 where the refractive index was 2.8 indicate "AVERAGE" in the evaluation criteria above, but when both examples are compared, the sample of the example 10 is superior in the viewpoint that the sample of example 10 showed less disorder in the light quantity distribution and more satisfactory result in the predetermined light quantity and orientation. The evaluation result of the sample of example 9 with the refractive index 1.7 indicates "GOOD". Further, the evaluation result of the sample of Example 8 with the refractive index 1.3 indicates "VERY GOOD", and it is the best result. According to the results as described above, it is found that the range between or equal to 1.3 to 2.0 is preferable, and the range between or equal to 1.3 to 1.7 is more desirable.

Examples 12 to 19

Lens 3 according to each of the examples 12 to 19 was produced as the following. In the examples 12 to 19, a methacrylic resin was used as the base material, and crosslinked MS type particles (product of Sekisui Plastics Co. Ltd., XX51F) were added as the filler 4. The mean particle size of the filler 4 was changed in each of the examples 12 to 19, and they were 0.1 µm, 0.3 µm, 0.5 µm, 1.0 µm, 7.0 µm, 10 µm, 15 µm, and 20 µm, respectively.

The additive amount of the filler 4 was set to 0.75 parts by weight per 100 parts by weight of the base material, in any of the examples 12 to 19. The ultraviolet absorbent (product of Shipro Kasei Kaisha, Ltd., seesorb 703) was added to the base material, in addition to the filler 4. The production method of the lens 3 was the same as that of example 1.

Comparative Examples 5 and 6

The lens according to the comparative examples 5 and 6 were produced, setting the mean particle size of the filler 4 to 0.05 μm and 25 μm, respectively, and the other conditions were configured to be the same as the examples 12 to 19.

(Evaluation)

Table 3 shows results of the evaluation regarding samples of the examples 12 to 19 and comparative examples 5 and 6, according to a method that is the same as the example 1.

TABLE 3

| | Comparative Example 5 | Example 12 | Example 13 | Example 14 | Example 15 | Example 16 |
|---|---|---|---|---|---|---|
| Particle Size | 0.05 | 0.1 | 0.3 | 0.5 | 1.0 | 7.0 |
| Judgment | POOR | AVERAGE | AVERAGE | GOOD | GOOD | VERY GOOD |

| | | Example 17 | Example 18 | Example 19 | Comparative Example 6 |
|---|---|---|---|---|---|
| | Particle Size | 10 | 15 | 20 | 30 |
| | Judgment | GOOD | GOOD | AVERAGE | POOR |

Evaluation criteria of "GOOD", "AVERAGE", and "POOR" shown in Table 3 is the same as the evaluation criteria shown in Table 1.

As obvious from Table 3, it is found that in the examples 12 to 19 where the particle size of the filler 4 was set to between or equal to 0.1 μm to 20 μm, the result of the evaluation is "GOOD: Almost no disorder is found in the light quantity distribution, and a predetermined light quantity and orientation are satisfied", or "AVERAGE: Some disorder is found in the light quantity distribution, or the predetermined light quantity and orientation are not satisfied to some extent". On the other hand, in the comparative example 5 where the particle size was smaller than 0.1 μm and in the comparative example 6 where the particle size was larger than 20 μm, the result of the evaluation was "POOR: Significant disorder is found in the light quantity distribution, or the predetermined light quantity and orientation are seriously unsatisfied".

The evaluation results of the samples in both the example 12 where the particle size was 0.1 μm and in the example 13 where the particle size was 0.3 μm indicate "AVERAGE" in the evaluation criteria above, but when both examples are compared, the sample of the example 13 is superior from the viewpoint that the samples of the example 13 showed less disorder in the light quantity distribution and more satisfactory result in the predetermined light quantity and orientation. The evaluation results of both the example 17 where the particle size was 10 μm and the example 18 where the particle size was 15 μm indicate "GOOD", but the sample of the example 17 is superior from the viewpoint above. Furthermore, the evaluation result of the sample of the example 16 where the particle size was 7.0 μm indicates "VERY GOOD", and it is the best result. According to the results described above, it is found that the range between or equal to 0.3 μm to 15 μm is preferable, and more preferably, the range should be between or equal to 0.5 μm to 10 μm. It is found that the range between or equal to 1.0 μm to 7.0 μm is more desirable.

What is claimed is:

1. A stroboscopic light emitting device comprising,
    an illuminator,
    a reflector located such that it reflects light from the illuminator, and
    a lens located adjacent the reflector so_as to allow the light reflected by the reflector to pass through and illuminate outwardly, wherein,
    the lens contains a methacrylic resin base material and a filler comprising crosslinked organic particles in the methacrylic resin base material, and a refractive index and a mean particle size of the filler are between or equal to 1.3 to 2.8 and between or equal to 0.1 μm to 20μm, respectively, and a content of the filler is between or equal to 0.1 parts by weight to 3.0 parts by weight per 100 parts by weight of the methacrylic resin base material.

2. The stroboscopic light emitting device according to claim 1, wherein,
    the reflector has a shape formed by bending a planar member.

3. The stroboscopic light emitting device according to claim 1, wherein the illuminator includes a light emitting diode.

* * * * *